G. W. HUBBARD.
COFFEE-POT.
No. 178,368.　　　　　　　　　　Patented June 6, 1876.
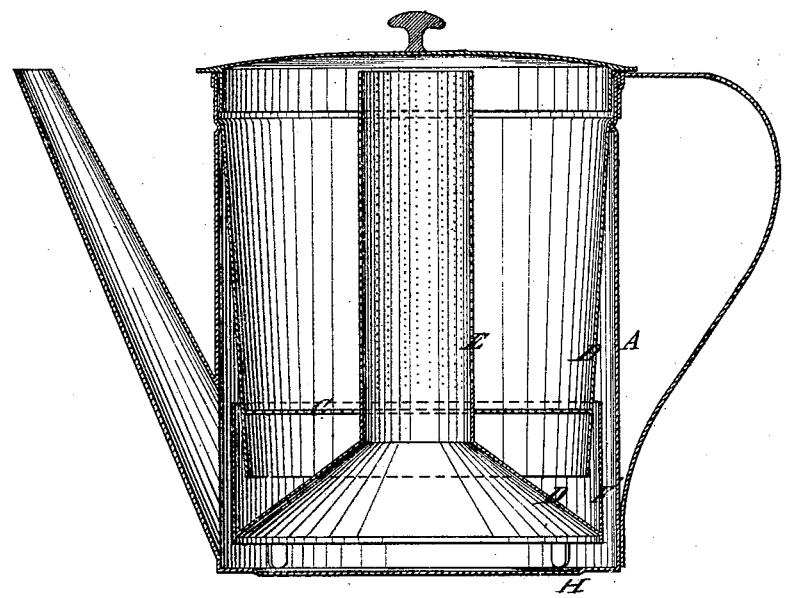
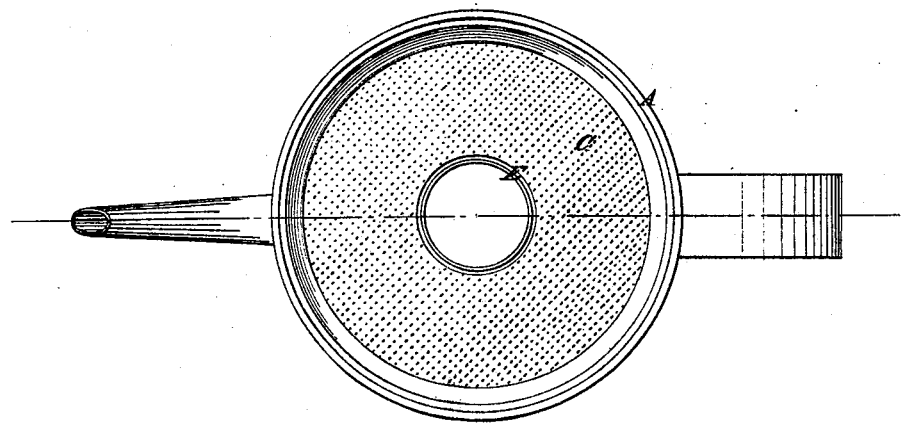
WITNESSES:　　　　　　　　　　INVENTOR:

UNITED STATES PATENT OFFICE.

GEORGE W. HUBBARD, OF WINDSOR, VERMONT.

IMPROVEMENT IN COFFEE-POTS.

Specification forming part of Letters Patent No. 178,368, dated June 6, 1876; application filed April 10, 1876.

*To all whom it may concern:*

Be it known that I, GEORGE W. HUBBARD, of Windsor, in the county of Windsor, State of Vermont, have invented a new and Improved Coffee-Pot, of which the following is a specification:

My invention consists of an inverted funnel, in combination with a filtering-cup, to cause the water to flow up and filter down through the coffee, the said funnel having a curb extending upward from its base around and above the bottom of the filter in order that the water, after passing down through the coffee, and on its way to the bottom of the pot, shall be made to flow upward at this place, leaving its sediment on the top of the funnel at its junction with the curb.

The tube by which the water is conducted up into the filtering-cup is perforated so as to deliver the water upon the coffee in jets, by which the effect is increased, and the bottom of the pot has a depression by which the water boils mainly in the middle portion, and thus ascends in the funnel and decends around the outside of it.

Figure 1 is a sectional elevation of my improved coffee-pot, taken on line $x$ $x$, Fig. 2, and Fig. 2 is a plan view.

Similar letters of reference indicate corresponding parts.

A is the exterior shell of the coffee-pot; B C, the filtering-cup; D E, the inverted funnel, and F the curb extending from the base of the funnel up around the lower part of the filtering-cup, to cause the sediment to be deposited within the curb, and thus insure clear and well-flavored coffee. The part E of the funnel is perforated to discharge the water in jets upon the coffee.

The bottom of the pot is depressed in the middle portion, as at H, so that that part will be more directly in contact with the heat to make the water boil over it, and ascend into the funnel, and not around and over it.

Having thus described my invention, what I claim as new, and desire to secure by Letters Patent, is—

The combination, with a bottom - depressed shell, A, of the filtering-cup B C, inverted funnel D E, and curb F, arranged substantially as and for the purpose specified.

GEORGE W. HUBBARD.

Witnesses:
   M. C. SMITH,
   WM. H. FULLERTON.